United States Patent
Weekly

(10) Patent No.: US 6,688,554 B2
(45) Date of Patent: Feb. 10, 2004

(54) THREAT-RESISTANT CUSHION

(76) Inventor: Roy L. Weekly, 12186 N. 114th Way, Scottsdale, AZ (US) 85259

( * ) Notice: Subject to any disclaimer, the term of this patent is extended or adjusted under 35 U.S.C. 154(b) by 0 days.

(21) Appl. No.: 10/098,640

(22) Filed: Mar. 15, 2002

(65) Prior Publication Data

US 2003/0085322 A1 May 8, 2003

Related U.S. Application Data

(60) Provisional application No. 60/337,829, filed on Nov. 8, 2001.

(51) Int. Cl.[7] ............................................... B64D 10/00
(52) U.S. Cl. ................................ 244/118.5; 244/122 R
(58) Field of Search ........................... 89/36.01, 36.02, 89/36.04, 36.05, 36.07, 36.11; 244/118.5, 118.6, 121, 122 R; 297/DIG. 5

(56) References Cited

U.S. PATENT DOCUMENTS

| | | | |
|---|---|---|---|
| 4,115,170 A | | 9/1978 | Sanson ......................... 156/79 |
| 4,180,883 A | | 1/1980 | Oldham ............................ 9/312 |
| 4,627,587 A | * | 12/1986 | McCutchan et al. ...... 244/118.5 |
| 4,782,735 A | * | 11/1988 | Mui et al. .................... 102/303 |
| 4,830,245 A | | 5/1989 | Arakaki ........................ 224/210 |
| 5,060,314 A | | 10/1991 | Lewis ............................. 2/2.5 |
| 5,164,536 A | * | 11/1992 | Barbaza et al. .......... 244/122 R |
| 5,180,880 A | * | 1/1993 | Zufle .......................... 89/36.02 |
| 5,283,918 A | * | 2/1994 | Weingartner et al. ........ 297/281 |
| 5,329,636 A | * | 7/1994 | Siddle ............................ 2/463 |
| 5,392,686 A | | 2/1995 | Sankar ....................... 89/36.05 |
| 5,441,331 A | * | 8/1995 | Vento ...................... 297/452.14 |
| 5,448,938 A | * | 9/1995 | Fernandez et al. .......... 89/36.02 |
| 5,477,572 A | * | 12/1995 | Weingartner et al. .... 297/452.48 |
| 5,530,966 A | | 7/1996 | West ................................. 2/2 |
| 5,584,737 A | | 12/1996 | Luhtala ....................... 441/107 |
| 5,850,052 A | | 12/1998 | Gabriel ....................... 89/36.05 |
| 6,073,884 A | * | 6/2000 | Lavergne ................. 244/122 R |
| 6,164,181 A | * | 12/2000 | Bruner ....................... 89/36.02 |
| 6,193,318 B1 | * | 2/2001 | Becker et al. ........... 297/452.49 |
| 2002/0185905 A1 | * | 12/2002 | Cassinelli .............. 297/440.22 |

FOREIGN PATENT DOCUMENTS

DE 19543127 A1 * 4/1997 ............. F41H/5/04

OTHER PUBLICATIONS

"The Business Security e–Journal" vol. 4, Oct. 2001, p. 6, lines 24–29, Shane Steinkamp.*

* cited by examiner

Primary Examiner—Charles T. Jordan
Assistant Examiner—Stephen A. Holzen
(74) Attorney, Agent, or Firm—Cahill, Von Hellens & Glazer P.L.C.

(57) ABSTRACT

A cushion, preferable of a buoyant material, includes a layer of threat-resistant material for precluding penetration by a projectile from a firearm or sharp edged or sharp pointed instrument and serves in the manner of a shield to prevent injury to a person's shielded body parts. The threat-resistant material may envelope the cushion, be disposed on either the front or the back side or be interleaved between the front and back sides. One or more straps may be disposed on a side to facilitate manipulation in positioning of the cushion to render it most effective to ward off an attack.

10 Claims, 2 Drawing Sheets

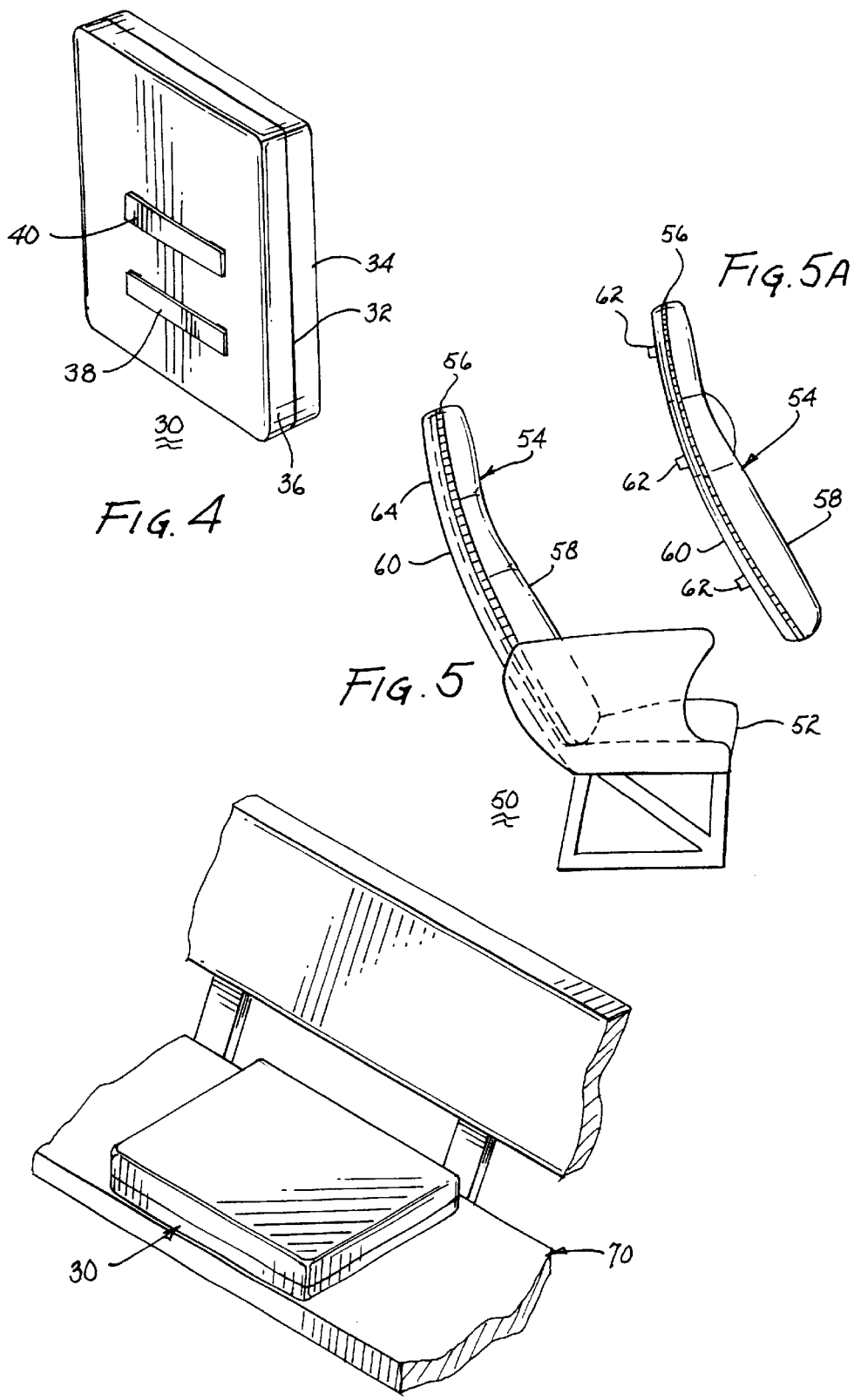

THREAT-RESISTANT CUSHION

CROSS REFERENCE TO RELATED APPLICATIONS

The present application is related to and claims priority from a provisional application entitled "THREAT-RESISTANT SEAT CUSHIONS", filed Nov. 8, 2001 and assigned Ser. No. 60/337,829 and disclosing an invention by the present inventor.

BACKGROUND OF THE INVENTION

1. Field of the Invention

The present invention relates to portable body protective devices and, more particularly, to a seat or back cushion usable to shield the user against injury from gunfire or an attacker having a sharp edged or sharp pointed weapon.

2. Description of Related Art

During medieval times chain mail was worn to minimize injuries from flying arrows, lances and during hand-to-hand combat. Garments of such chain mail were relatively effective but very heavy and tended to limit the agility and movement by a user. Similarly, rigid contoured plates were worn for the same purposes and had the same drawbacks. For the most part, these personal protective devices are not effective to prevent injury from gunfire due to the speed and size of projectiles discharged from presently available firearms.

As technology developed, particularly in the field of man made fibers, lighter weight materials are now available that offer significant resistence against penetration by projectiles discharged from currently available hand-held guns. Furthermore, these materials are essentially impenetrable to sharp edged instruments, such as knives of various sorts, bayonets, icepicks, scissors, etc., any of which could otherwise inflict a painful, debilitating or fatal injury. Consequently, the military and law enforcement personnel have used rigid, semi-rigid or flexible body armor made of some or all of these materials for years to protect themselves against injury from gunfire or a weapon wielding attacker. Materials of the type described above are sold by Dupont under the trademark Kevlar, by Allied Signal under the trademark Spectra, by Akzo Nobel under the trademark Twaron and by Toyobo under the trademark Dyneema. Collectively, these materials will be referred hereinafter as threat-resistant materials. Flexible metallic materials as well as various polymers would also be within this group of threat-resistant materials.

SUMMARY OF THE INVENTION

The present invention is a removable seat or back cushion typically usable in conjunction with a seat mounted within the cabin of a commercial airliner. The removable cushion includes threat-resistant material located on one side or the other or internally to prevent penetration of a projectile from a firearm or penetration of a sharp edged or sharp pointed instrument and thereby protect a user against a potentially fatal injury. Straps may be attached to the cushion to afford holding the cushion in front of a user's body part to be protected against attack without unnecessarily exposing the user's hands and arms to injury.

BRIEF DESCRIPTION OF THE DRAWINGS

The present invention will be described with greater specificity and clarity with reference to the following drawings, in which:

FIG. 4 illustrates another embodiment of the seat cushion shown in FIG. 2;

FIG. 5 illustrates a representative removable back cushion usable with the seat, such as the type shown in FIG. 1;

FIG. 5A illustrates the back cushion removed from a supporting seat shown in FIG. 5; and FIG. 6 illustrates a personal portable seat cushion of the type shown in FIG. 2 useable in conjunction with the seat or backrest of a park bench, stadium seat, or the like.

DESCRIPTION OF THE PREFERRED EMBODIMENT

On numerous occasions, passengers captive within the cabin of a commercial airliner have been attacked by persons committing mischief due to a mental imbalance or by persons in the act of hijacking the airliner. Generally, the passengers are essentially unprotected from such attack except to the extent that each may have sufficient skills in the field of martial arts to deflect such attack or subdue the attacker. As most persons have insufficient skills of this type of self protection, serious and often fatal injuries result. Attacks by mentally imbalanced persons or persons who seek to kidnap one or more passengers in other modes of public transportation, such as buses, trains, trams, boats and the like occur from time to time. These passengers are similarly essentially devoid of sufficient skills to protect themselves against debilitating or fatal injury. Personal attacks in public places, such as parks, stadiums and the like occur with too great a frequency. Again, most persons so attacked do not have the skills to effectively protect themselves.

At each of these public or quasi-public places, the persons are usually seated on cushioned or non-cushioned seats or benches. If such seats and benches have cushions, such cushions constructed in accordance with the present invention can be used to thwart or deflect attack from gunfire or a sharp edged or sharp pointed instrument and minimize any injury inflicted. At locations where the seats or benches have no cushions, a user can bring his own cushion constructed in accordance with the present invention to serve as protection against an attack and minimize the injury that may result.

Figure 1:
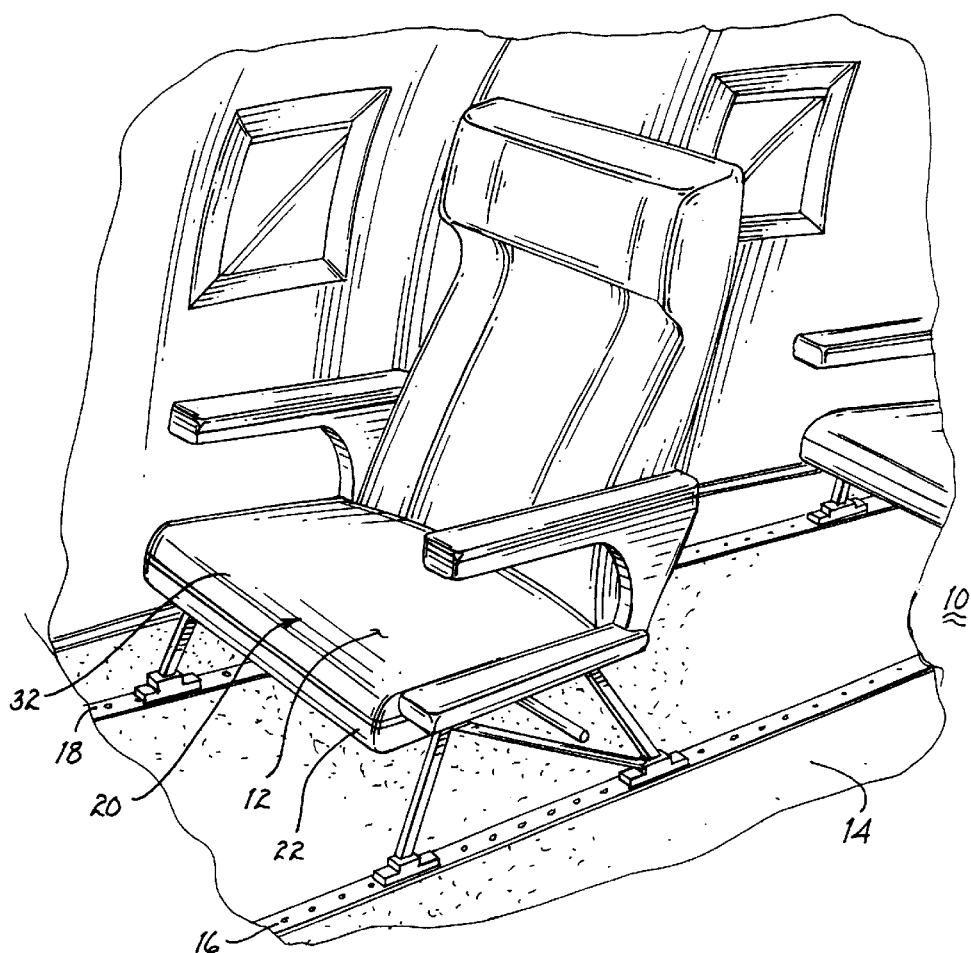
FIG. 1 illustrates a representative seat mounted within the cabin of a representative commercial airliner.

FIG. 1 illustrates a part of a representative cabin 10 of a conventional commercial airliner having a plurality of seats 12 attached to a deck or a floor 14 via tracks 16, 18. A conventional airline seat 12 includes a removable seat cushion 20 located on a seat frame 22 and intended to be used by a passenger as a flotation device in the event of a landing on water. That is, the conventional seat cushion contains sufficient buoyant material to support a person in water to permit the person to float. Such conventional cushions have essentially no resistance to penetration by a projectile from a firearm nor to prevent penetration of a sharp edged or sharp pointed instrument. Thus, a conventional seat cushion offers little, if any, protection if a passenger were to attempt to use it as a shield.

For a period of years, hijackers and terrorists have sought and achieved command of a commercial airliner by threatening injury or death to one or more passengers. In many cases, passengers have in fact been deliberately injured or killed by such hijacker(s) or terrorist(s), which has occurred primarily because the injured or killed passengers had no means of protecting themselves against attack. The purpose of the present invention is to provide an easily accessible shield for use by a person to protect himself/herself against injurious or fatal attack by a hijacker, terrorist or even a deranged fellow passenger.

Figure 2:
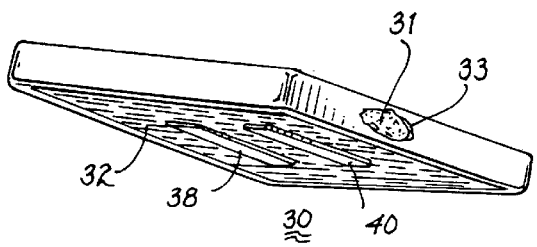
FIG. 2 illustrates a removable seat cushion useful for protecting a user against attack.
Figure 3:
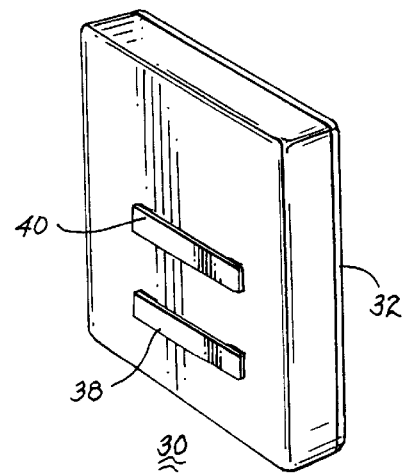
FIG. 3 illustrates an embodiment of the seat cushion shown in FIG. 2.

Referring jointly to FIGS. 2, 3 and 4, a cushion 30, which may be a replacement for a conventional cushion mounted upon seat frame 22 of seat 12, will be described in further detail. Cushion 30 includes cushioning material 31 disposed therein (as shown in cutaway section 33). The cushioning material may be buoyant material, as required by the Federal Aviation Administration (FAA) in the unlikely event of a water landing. Threat-resistant material 32, as described above, may be attached to or form the bottom surface of cushion 30, as illustrated in FIG. 2. Alternatively, material 32 may be located adjacent the top surface or formed as the top surface of cushion 30, as illustrated in FIG. 3. To prevent soiling of material 32 due to normal risks of spillage, etc., material 32 may be interleaved between layers 34, 36 of cushion 30, as shown in FIG. 4. Finally, the complete exterior surface of cushion 30 may be covered with material 32, as representatively shown in FIG. 1.

To permit a person to hold cushion 30 in front of a body part to be protected without exposing the person's hands or arms to injury, one or more straps 38, 40 may be attached to the underside of the cushion to form loops through which the person's arm(s) or hand(s) may be placed. Thereby, manipulation of the cushion to ward off an attack is readily accomplished with minimal exposure to the person's hands/arms. Preferably, straps 38, 40 are on the bottom surface of the cushion so that they will not interfere with normal activities when cushion 30 is mounted upon seat frame 22 (see FIG. 1). It is to be understood that straps 38, 40 may be mounted upon one or both opposed sides of cushion 30 or upon the sides of the cushion and whether or not such straps are in addition to the straps on either the top or bottom surface of the cushion.

FIG. 5 illustrates a side view of a seat 50, such as a conventional seat used in a commercial airliner and comparable to seat 12 shown in FIG. 1. Seat 50 includes a conventional seat cushion 52 and a back cushion 54. Generally, back cushion 54 is significantly larger than seat cushion 52. As an alternative embodiment to cushion 30, back cushion 50 may be removable, as shown in FIG. 5A. Because back cushion 54 is significantly larger than seat cushion 52, a person using the back cushion as a shield or barrier against an attack exposes less of the person's body. As illustrated, threat-resistant material 56, of the type described above, may be interleaved between front and rear surfaces 58, 60 of the back cushion. As shown with respect to cushion 30, threat-resistant material 56 of back cushion 54 may be formed as part of either the front or the back surfaces of the back cushion. To provide a means for gripping and holding back cushion 56 to protect body parts of the user, one or more straps, representatively identified by numeral 62, may be attached to back surface 60. It is to be understood that the back cushion is supported by a frame or a shell 64 or the like forming a part of seat 50.

As the FAA certification requirements for commercial airliners require providing each passenger with a flotation device, removable back cushion 54 may be used to comply with such requirements. Thus, the back cushion could include buoyant material to provide flotation capability to a user in the event of a water landing.

As discussed above, persons have been attacked in various vehicles used for public transportation, such as buses, trains, trams, boats etc. These attacks have usually resulted in injury and sometimes in a fatality. To provide a person with not only a comfortable seat but also a shield in an attempt to protect the person against an attack, cushion 30 described above may be portable and used in conjunction with travel in a public transport vehicle. Such a cushion 30 resting upon a representative seat 70 is illustrated in FIG. 6. It is to be understood that seat 70 may be a conventional bench seat or individual seat located in a public transport vehicle. The embodiment of cushion 30 shown in FIG. 6 is equivalent to that shown in FIG. 4, but could be any of the embodiments shown in FIG. 1, 2 or 3.

As personal attacks have occurred at public gathering places, such as in stadiums, ball parks, amusement parks and city parks, seat 70 shown in FIG. 6 is representative of each of the seating facilities available therein. Thereby, a person at such public gathering places will have an easily available shield to protect himself/herself against attack from a hoodlum or deranged person.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. An aircraft seat having a removable seat cushion extending across the seat portion of the aircraft seat said seat cushion comprising in combination:

a) an outer covering;

b) cushioning material; and c) threat-resistant material adapted to prevent penetration of a projectile discharged from a firearm and to prevent penetration of a sharp edged or sharp pointed instrument, said threat-resistant material extending across and coincident with the perimeter of said seat cushion.

2. An aircraft seat cushion as set forth in claim 1 wherein said threat-resistant material extends across a surface of said seat cushion.

3. An aircraft seat having a removable seat cushion extending across the scat portion of the aircraft seat, said seat cushion comprising in combination:

a) an outer covering;

b) cushioning material; and c) threat-resistant material adapted to prevent penetration of a projectile discharged from a firearm and to prevent penetration of a sharp edged or sharp pointed instrument, said treat-resistant material extending across said seat cushion and being interleaved with layers of said seat cushion.

4. An aircraft seat having a removable seat cushion extending across the seat portion of the aircraft scat said scat cushion comprising in combination:

a) an outer covering;

b) cushioning material;

c) threat-resistant material adapted to prevent penetration of a projectile discharged from a firearm and to prevent penetration of a sharp edged or sharp pointed instrument, said threat-resistant material extending across said seat cushion and being interleaved with layers of said seat cushion; and d) said seat cushion including front and back surfaces and at least one strap having both ends secured to one of said front and back surfaces and adapted for grasping.

5. An aircraft seat cushion as set forth in claim 4 wherein said cushioning material is buoyant material.

6. A removable seal cushion adapted for use with and extending across a seat, said seat cushion comprising in combination:

a) an outer covering;

b) cushioning material; and c) threat-resistant material adapted to prevent penetration of a projectile discharged from a firearm and to prevent penetration of a sharp edged or sharp pointed instrument, said threat-resistant material extending across and coincident with the perimeter of said seat cushion.

7. A seat cushion as set forth in claim 6 wherein said threat-resistant material extends across a surface of said seat cushion.

8. A seat cushion adapted for use with and extending across a seat, said seat cushion comprising in combination:

a) an outer covering;

b) cushioning material; and c) threat-resistant material adapted to prevent penetration of a projectile discharged from a firearm and to prevent penetration of a sharp edged or sharp pointed instrument, said threat-resistant material extending across said seat cushion.

9. A seat cushion adapted for use with and extending across a seat, said seat cushion comprising in combination:

a) an outer covering;

b) cushioning material;

c) threat-resistant material adapted to prevent penetration of a projectile discharged from a firearm and to prevent penetration of a sharp edged or sharp pointed instrument, said threat-resistant material extending across said seat cushion; and d) said seat cushion including front and back surfaces and at least one strap having both ends secured to one of said front and back surfaces and adapted for grasping.

10. A seat cushion as set forth in claim 6 wherein said cushioning material is buoyant material.

\* \* \* \* \*